United States Patent
Neuneier et al.

(10) Patent No.: US 6,282,529 B1
(45) Date of Patent: Aug. 28, 2001

(54) METHOD AND APPARATUS FOR COMPUTER-SUPPORTED GENERATION OF AT LEAST ONE ARTIFICIAL TRAINING DATA VECTOR FOR A NEURAL NETWORK

(75) Inventors: Ralf Neuneier, München; Hans-Georg Zimmermann, Starnberg/Percha, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/254,298

(22) PCT Filed: Jul. 15, 1997

(86) PCT No.: PCT/DE97/01497

§ 371 Date: Mar. 3, 1999

§ 102(e) Date: Mar. 3, 1999

(87) PCT Pub. No.: WO98/10352

PCT Pub. Date: Mar. 12, 1998

(30) Foreign Application Priority Data

Sep. 3, 1996 (DE) .............................................. 196 35 758

(51) Int. Cl.[7] ....................................................... G06N 3/02

(52) U.S. Cl. .................................. 706/15; 706/16; 706/23

(58) Field of Search .................................. 706/23, 15, 16; 382/157

(56) References Cited

U.S. PATENT DOCUMENTS

| | | |
|---|---|---|
| 5,359,699 | 10/1994 | Tong et al. |
| 5,444,796 * | 8/1995 | Ornstein ................................. 382/157 |
| 5,590,218 * | 12/1996 | Ornstein ................................. 382/157 |
| 5,806,053 * | 8/1998 | Tresp et al. ............................ 706/23 |

FOREIGN PATENT DOCUMENTS

WO 95/11486    4/1995   (WO) .

OTHER PUBLICATIONS

De Freitas, J.F.; Niranjan, M.; Gee, A.H., Hybrid sequential Monte Carlo/Kalman methods to train neural networks in non–stationary environments, Acoustics, Speech, and Signal Processing, 1999. Proceedings., 1999 IEEE International Conference on, vol.: 2, Mar. 1999.*

Cheng–Hsiung Hsieh; Manry, M.T.; Ting–Cheng Chang, Calculation of Cramer Rao maximum a posteriori lower bounds from training data, Systems, Man, and Cybernetics, 1998. Oct. 11–14, 1998 IEEE International Conference on, vol. 2, 1998, pp.: 1691–1695 v.*

Fukumizu, K.; Watanabe, S., Error estimation and learning data arrangement for neural networks, Neural Networks, 1994. IEEE World Congress on Computational Intelligence., 27 Jun.–2 Jul 1994IEEE International Conference on, vol.: 2, 1994, pp.: 777–7.*

Hampshire, J.B., II; Vijaya Kumar, B.V.K., Differential learning leads to efficient neural network classifiers, Acoustics, Speech, and Signal Processing, 1993. ICASSP–93., 1993 IEEE International Conference on, vol.: 1, Apr. 27–30, 1993, pp.: 613–661.*

(List continued on next page.)

Primary Examiner—Mark R. Powell
Assistant Examiner—Wilbert L. Starks, Jr.
(74) Attorney, Agent, or Firm—Bell, Boyd & Lloyd LLC

(57) ABSTRACT

A method and apparatus for computer-supported generation of at least one artificial training data vector for a neural network is provided wherein a residual error is determined after a training of a neural network has occurred. A backward error is then determined from the residual error. Artificial training data vectors are generated from a statistical random process that is based on a statistical distribution, such that the respective backward error for an input of the neural network is taken into consideration.

18 Claims, 2 Drawing Sheets

OTHER PUBLICATIONS

Brauer, P.; Hedelin, P.; Huber, D.; Knagenhjelm, P., Probability based optimization for network classifiers, Acoustics, Speech, and Signal Processing, 1991, ICASSP–91., 1991 International Conference on, Apr. 14–17, 1991, pp.: 133–136 vol. 1.*

Ney, H., On the probabilistic interpretation of neural network classifiers and discriminative training criteria, Pattern Analysis and Machine Intelligence, IEEE Transactions on, vol.: 17 2, Feb. 1995, pp.: 107–119.*

Cook, G.D.; Robinson, A.J., Training MLPs via the expectation maximization algorithm, Artificial Neural Networks, 1995., Fourth International Conference on, 1995, pp.: 47–52, Jan. 1995.*

Ikeda, K.; Murata, N.; Amari, S,–I., Prediction error of stochastic learning machine, Neural Networks, 1994. IEEE World Congress on Computational Intelligence., 1994 IEEE International Conference on, vol.: 2, 27 Jun.–2 Jul. 1994, pp.: 1159–1162 vol.*

David D. Lewis and William A. Gale; A sequential algorithm for training text classifiers; Proceedings of the seventeenth annual international ACM–SIGIR conference on Research and development in information retrieval, Jul. 3–6, 1994, pp. 3–12, Mar. 1999.*

Evolution of Neural Network Training Set through Addition of Virtual Samples, Sungzoon Cho et al., pp. 685–688.

An Artificial Neural Network for Sound Localization using Binaural Cues, Datum et al., pp. 372–382.

An Innovative Approach to Training Neural Networks for Strategic Management of Construction Firms, Slicher et al., pp. 87–93.

Neural Networks for Pattern Recognition, Bishop.

An Information Theoretic Approach to Neural Computing, Neuronale Netze in der Okonomie Using Additive Noise in Back–Propagation Training, pp. 24–38.

* cited by examiner

METHOD AND APPARATUS FOR COMPUTER-SUPPORTED GENERATION OF AT LEAST ONE ARTIFICIAL TRAINING DATA VECTOR FOR A NEURAL NETWORK

BACKGROUND OF THE INVENTION

1. Field of the Invention

Neural networks learn with the assistance of training data. In many areas of application, the training data are very noise-infested; for example, when modelling financial data such as stocks or currency rates. The training data thus contain random disturbances that have nothing to do with the system dynamics actually being modelled.

The transient structure of the random noise, however, also can be learned as a result of the approximation capability of the neural networks. This phenomenon is referred to as over-training of the neural network. The learning process of the neural network is considerably impeded in highly noise-infested systems due to an over-trained neural network since the generalization capability of the neural network is negatively influenced.

This problem is gaining in significance in areas of application wherein only a small plurality of training data vectors is available for the adaption of the neural network to the application; i.e., the function that is represented by the training data vectors and is to be modelled.

Particularly in these areas of application, but also generally in a training method of a neural network, it is advantageous to artificially generate additional training data vectors in order to obtain a larger training dataset.

2. Description of the Prior-Art

It is known to implement the generation of the artificial training vectors by infesting the available training data vectors of the training dataset with noise. In this context, it is known from document [1] to determine the training dataset with Gaussian noise having the average value 0 and a variance a that is set to the same value for all inputs of the neural network.

It is known from document [4] to generate training data by introducing additional noise. It is thereby known to utilize what is referred to as the jackknife procedure. This method, however, exhibits a number of disadvantages.

Indeed wherein a Gaussian noise with a variance that is set to the same value for all inputs of the neural network is employed for generating the additional training data vectors as statistical distribution that is used for generation, training data vectors are newly generated that contain no statement whatsoever about the system to be modelled. Further, the training data vectors contain no information whatsoever about the actual noise underlying the system. Although the training dataset is thus enlarged, this does not have to support the learning process since a permanently predetermined noise that has nothing to do with the actual system dynamics is employed for training the neural network. Over-training can then nonetheless arise.

Basics about neural networks are known, for example, from document [2]. Basics about employing neural networks in the economy are known, for example, from document [3].

SUMMARY OF THE INVENTION

The present invention is thus based on the problem of artificially forming new training data vectors for a neural network, wherein an over-training of the neural network is avoided.

In a method, of the present invention a residual error is determined after the training of the neural network with available training data vectors of a training dataset. Upon employment, of a gradient descent method, for example an input-related backward error is identified from the residual error. The determination of the backward error corresponds to the standard procedure during the training of a neural network for the adaption of the individual weightings of the neural network. When the input-related backward error has been identified, a statistical distribution allocated to the respective input is generated taking the respective backward error into consideration, and the artificial training data vector is generated taking the respective statistical distribution at the inputs of the neural network into consideration.

With this method, it is possible to generate additional training data vectors that contain information about the neural network and the current structure of the neural network after the training of the neural network with the available training data vectors.

Accordingly the artificially generated training data vectors are dependent on the backward error that still exists after the training of the neural network and, thus, are dependent on the performance of the neural network. This further means that the generated training data vectors contain information about the system to be modelled. An over-training of the neural network due to the additional training data vectors can be avoided in this way.

The apparatus of the present invention includes a calculating unit that is configured such that the above-described method steps are implemented.

Given an online approximation of the neural network, which is also referred to as on line training, it is advantageous to also adapt the respective statistical distribution to the modified training data set. As a result, the system to be modelled is even more precisely modelled by the neural network.

DESCRIPTION OF THE DRAWINGS

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
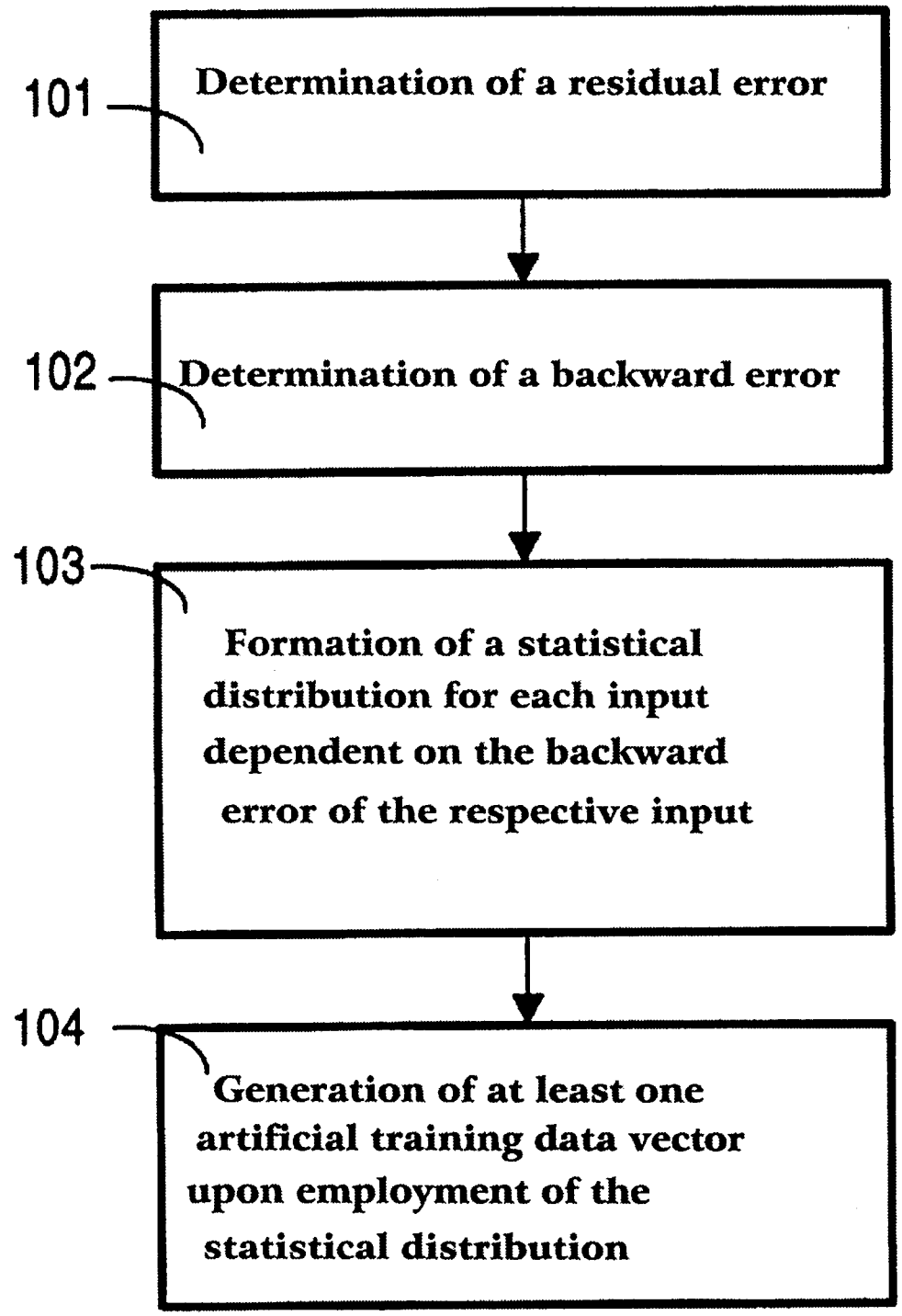
FIG. 1 shows a flowchart in which the individual method steps of the present invention are shown.
Figure 2:
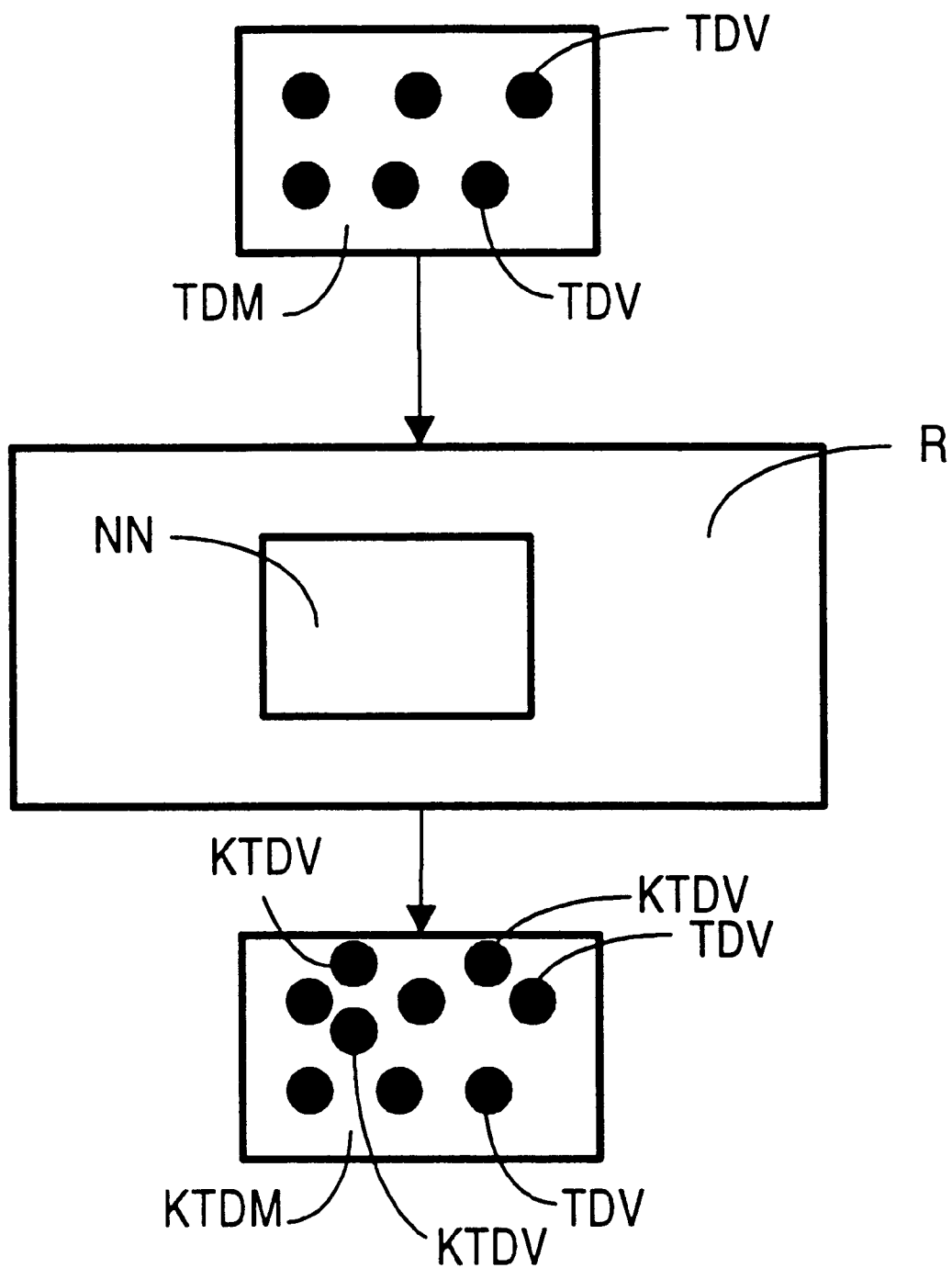
FIG. 2 shows a diagram of a computer arrangement with which the method of the present invention can be implemented.

The individual method steps of the method are shown in FIG. 1. In a first step (101), a computer R determines a residual error RE after the conclusion of the training of the neural network NN with an arbitrary plurality of training data vectors $TDV_i$ of a training dataset TDM.

Given, for example, m training data vectors TDV with rated values $t_j$ allocated to the training data vectors, wherein the respective training data vector is unambiguously identified with an index i, the residual error is determined in the following way:

$$RE = \sum_{i=1}^{m} (t_i - y_i)^2. \tag{1}$$

However, any other arbitrary rule can, of course, be employed for the formation of the residual error RE after the training of the neural network NN.

A backward error RFj is determined at step (102) after the determination of the residual error. For example, the determination of the backward error RF can ensue upon employment of a gradient descent method according to the input signals of the neural networks NN.

The following nomenclature is employed below for the training data vector TDVI as well as for the input data of the neural network NN that derive from the training data vectors TDVi and a noise term vector e:

Training data vector TDVi: $\underline{x} = (x_1, \ldots, x_j, \ldots x_n)$

Noise term vector: $\underline{e} = (e_1, \ldots, e_j, \ldots e_n)$

Input data vector: $\underline{z} = (x_1 + e_1, \ldots, x_j + e_j, \ldots x_n + e_n)$ A plurality of components of the training data vectors TDVi is referenced n, the noise term vector is referenced e and, respectively, the input data vector is referenced z.

The backward error RFj is individually determined for each input j of the neural network NN, wherein a respective component of the input data vector z and, respectively, an input of the neural network NN is unambiguously referenced with an index j.

This occurs for example, according to the known gradient descent method for the training of the neural network NN. The backward error RF of the input data vector z thus derives from the respective partial derivations of the residual error RE according to the individual input signals $z_j$.

$$RFj = \frac{\delta E^t}{\delta z_j^t}. \quad (2)$$

The symbol t respectively unambiguously identifies a point in time at which the determination of the backward error RFj ensues. Taking the backward error RFj into consideration, a statistical distribution $S_j$ is now formed for every input j of the neural network NN in a third step (103). Any desired statistical distribution for the description of a random process can be generally employed as statistical distribution $S_j$. For simpler presentation, however, a uniform statistical distribution and a Gaussian statistical distribution $S_j$ are explained in greater detail below.

A uniform distribution width $S^t_j$ derives for the uniform distribution; for example, according to the following rule:

$$s^t_j = \frac{1}{t} \sum_{k=1}^{t} \left| \frac{\partial E^k}{\partial z_j^k} \right|. \quad (3)$$

The noise term $e^t_j$ that is employed for forming at least one artificial training vector KTDV lies in the region of the interval:

$$e^t_j \in [-s^t_j, s^t_j] \quad (4).$$

Given a Gaussian distribution, the noise width $S^t_j$ derives according to the following rule:

$$s^t_j = \frac{1}{t} \sum_{k=1}^{t} \left( \frac{\partial E^k}{\partial z_j^k} \right)^2. \quad (5)$$

The noise term $e^t_j$ for this exemplary case derives according to the following rule:

$$e^t_j \in N\left(0, \sqrt{s^t_j}\right). \quad (6)$$

A normally distributed statistical distribution $S_j$ with an average value 0 and the standard deviation $$\sqrt{s^t_j}$$

is referenced $$N\left(0, \sqrt{s^t_j}\right).$$

The at least one artificial training data vector KTDV is generated at step (104) upon employment of the respective statistical distribution $S_j$. Graphically, this means that the artificial training data vector KTDV is generated by the random process respectively described by the statistical distribution $S_j$. As result of this procedure, the artificial training data vectors KTDV statistically have the same properties as the originally available training data vectors TDVi. This cannot be achieved by noise infestation with a uniform noise process as known from document [1]. The method can be graphically described as follows. The input data, represented by the originally available training data vectors TDVi, are noise infested with a random process that, for every input, is dependent on the respective gradient error function according to the input signals.

The respective noise width $S^t_j$ can be graphically interpreted as follows:

(1) A Small values of $S^t_j$ are generated by inputs that generate a good imaging onto the training data.
(2) A Small values of the noise width $S^t_j$, however, can also indicate unimportant inputs that are not relevant for training the neural network.
(3) High values of the noise width $S^t_j$ indicate that the input j has considerable significance but the neural network NN is not previously in the position to learn an adequate imaging.
(4) Noise on inputs having a high noise width $S^t_j$ "stiffens" the neural network NN. As a result an over-training is prevented, which leads to a better generalization capability of the neural network NN. With respect to (1) and (2) above, it is within the sense of the object that no or only little noise is added to the originally existing training data vectors TDVi.

This method can be especially advantageously employed in application situations wherein only a relatively slight number of training data vectors TDVI is available for training the neural network NN. As a result the training dataset TDM can be considerably artificially expanded into an expanded training dataset KTDM without falsifying the actual system dynamics since the statistical properties of the training dataset TDM are also contained in the artificial training data vectors KTDV. A typical application situation of the method lies in the analysis of financial markets, for example, stock markets or bond markets.

When what is referred to as an online learning method is used for training the neural network NN, whereby further training data vectors are determined during the generalization phase with which the neural network NN is then trained further in the generalization phase, then it is provided in a development of the method to also adapt the statistical distributions $S_j$ dependent on the modification of the training dataset TDM that is formed by the training data vectors TDVI. For example, this can occur according to the following rule for a uniform distribution:

$$s_j^{t+1} = (1-\alpha) \cdot s_j^t + \alpha \cdot \left| \frac{\partial E^k}{\partial z_j^k} \right| \quad (7)$$

For example, the following adaption rule can be utilized for a Gaussian statistical distribution $S_j$:

$$(s_j^{t+1})^2 = (1-\alpha) \cdot (s_j^t)^2 + \alpha \cdot \left( \frac{\partial E^k}{\partial z_j^k} \right)^2. \quad (8)$$

An adaption factor is referenced $\alpha$. It has proven advantageous to employ the reciprocal of the plurality of training data vectors TDVi as value for the adaption factor $\alpha$.

Although the present invention has been described with reference to specific embodiments, those of skill in the art will recognize that changes may be made thereto without departing from the spirit and scope of the invention as set forth in the hereafter appended claims.

The following publications were cited in the framework of this document:

[1] C. M. Bishop, Neural Networks for Pattern Recognition, Clarendon Press, Oxford, U.K., ISBN 0–19–853864–2, pp. 346–349, 1994.

[2] G. Deco and D. Obradovic, An Information-Theoretic Approach to Neural Computing, Springer Verlag, New York, USA, ISBN 0–387–94666–7, pp. 23–37, 1996.

[3] H. Zimmermann and Rehkugler, Neuronale Netze in der Okonomie, Chapter 1, Neuronale Netze als Entscheidungskalkul, Vahlen Verlag, Munich, ISBN 3–8006–1871–0, pp. 3–20, 1994.

[4] L. Holmstrbm and P. Koistinen, using Additive Noise in Back-Propagation Training, IEEE Transactions on Neural Networks, Vol. 3, No. 1, pp, 24–38, January 1992.

What is claimed is:

1. A method for computer supported generation of at least one artificial training data vector for a neural network, comprising the steps of:
   training the neural network with training data vectors of a training data set;
   determining a residual error after the step of training the neural network;
   determining a backward error from the residual error for at least one input of the neural network;
   generating a statistical distribution allocated to the at least one input, the statistical distribution being dependent on a size of the respective backward error; and
   generating the at least one artificial training data vector given the respective allocation of the statistical distribution to the at least one input, wherein the at least one artificial training data vector exhibits the same properties as an associated training data vector of the training data set.

2. A method as claimed in claim 1, wherein the backward error is determined with a gradient descent method.

3. A method as claimed in claim 2, wherein the gradient descent method is performed via a back-propagation method.

4. A method as claimed in claim 1, wherein the statistical distribution is generated via a uniform distribution, a distribution width of the uniform distribution being dependent on the backward error.

5. A method as claimed in claim 4, wherein, given an online approximation of the neural network, the statistical distribution is adapted to a newly determined backward error according to an arbitrary plurality of new training data vectors.

6. A method as claimed in claim 1, wherein the statistical distribution is generated via a Gaussian distribution, a distribution width of the Gaussian distribution being dependent on the backward error.

7. A method as claimed in claim 6, wherein, given an online approximation of the neural network, the statistical distribution is adapted to a newly determined backward error according to an arbitrary plurality of new training data vectors.

8. A method as claimed in claim 1, wherein the method is utilized for modeling a nonlinear function that is described with a low number of training data vectors.

9. A method as claimed in claim 1, wherein the method is utilized in the analysis of a financial market.

10. An apparatus for the computer supported generation of at least one artificial training data vector for a neural network, the apparatus including a calculating unit which comprises:
    means for training the neural network with training data vectors of a training data set;
    means for determining a residual error after training the neural network;
    means for determining a backward error from the residual error for at least one input of the neural network;
    means for generating a statistical distribution allocated to the at least one input, the statistical distribution being dependent on a size of the respective backward error; and
    means for generating the at least one artificial training data vector given the respective allocation of the statistical distribution to the at least one input, wherein the at least one artificial training data vector exhibits the same properties as an associated training data vector of the training data set.

11. An apparatus as claimed in claim 10, wherein the backward error is determined with a gradient descent method.

12. An apparatus as claimed in claim 11, wherein the gradient descent method is performed via a back-propagation method.

13. An apparatus as claimed in claim 10, wherein the statistical distribution is generated via a uniform distribution, a distribution width of the uniform distribution being dependent on the backward error.

14. An apparatus as claimed in claim 13, wherein, given an online approximation of the neural network, the statistical distribution is adapted to a newly determined backward error according to an arbitrary plurality of new training data vectors.

15. An apparatus as claimed in claim 10, wherein the statistical distribution is generated via a Gaussian distribution, a distribution width of the Gaussian distribution being dependent on the backward error.

16. An apparatus as claimed in claim 15, wherein, given an online approximation of the neural network, the statistical distribution is adapted to a newly determined backward error according to an arbitrary plurality of new training data vectors.

17. An apparatus as claimed in claim 10, wherein the apparatus is utilized for modeling a non-linear function that is described with a low number of training data vectors.

18. An apparatus as claimed in claim 10, wherein the apparatus is utilized in the analysis of a financial market.

* * * * *